(12) United States Patent
Sato et al.

(10) Patent No.: US 6,840,205 B2
(45) Date of Patent: Jan. 11, 2005

(54) AIR INTAKE ASSEMBLY FOR VEHICLE ENGINE AND METHOD OF MANUFACTURING SAME

(75) Inventors: Eiichi Sato, Yokohama (JP); Satoru Andou, Kawasaki (JP); Sadayuki Fujimoto, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 1 day.

(21) Appl. No.: 10/623,161

(22) Filed: Jul. 21, 2003

(65) Prior Publication Data

US 2004/0182348 A1 Sep. 23, 2004

(30) Foreign Application Priority Data

Sep. 3, 2002 (JP) ........................................ 2002-257515

(51) Int. Cl.[7] .............................................. B60K 13/02
(52) U.S. Cl. ................ 123/184.21; 296/30; 296/203.03
(58) Field of Search ....................... 296/203.01–203.03, 296/187.12, 191, 193.04, 198, 30

(56) References Cited

U.S. PATENT DOCUMENTS 4,078,840 A * 3/1978 Itoh ........................... 296/192
4,470,341 A * 9/1984 Hirukawa et al. ............. 454/146
6,547,316 B2 * 4/2003 Chung .................... 296/187.03
6,767,052 B2 * 7/2004 Kubota ................... 296/203.02

FOREIGN PATENT DOCUMENTS

| JP | 2-93124 U | 7/1990 |
| JP | 5-85199 A | 4/1993 |
| JP | 6-16155 A | 1/1994 |
| JP | 9-189273 A | 7/1997 |

* cited by examiner

Primary Examiner—Marguerite McMahon
(74) Attorney, Agent, or Firm—Foley & Lardner LLP

(57) ABSTRACT

The upper and lower edges of a reinforcement (12) are fixed to hood ledges (1) and disposed between the hood ledges (1) and fenders (7). The hood ledges (1) and reinforcement (12) form a substantially rectangular parallelopiped space. An intake air duct (6) is fixed to the hood ledges (1). The opening of the intake air duct connects the interior of the intake air duct (6) to the substantially rectangular parallelopiped-shaped space. An opening which forms an air intake port (15), is formed in a part opposite the opening of the intake air duct (6) of the reinforcement (12).

10 Claims, 5 Drawing Sheets

AIR INTAKE ASSEMBLY FOR VEHICLE ENGINE AND METHOD OF MANUFACTURING SAME

FIELD OF THE INVENTION

This invention relates to an air intake assembly for a vehicle engine, and in particular relates to an assembly for aspirating air from a space formed between a hood ledge forming an engine room, and a fender.

BACKGROUND OF THE INVENTION

Jikkai Hei 02-93124 published by the Japanese Patent Office in 1990 and Tokkai Hei 09-189273 published by the Japanese Patent Office in 1997 disclose an air intake assembly comprising an air intake port which opens onto a space formed between a hood ledge panel forming an engine room and a fender outside the engine room.

SUMMARY OF THE INVENTION

However, in the aforesaid prior art, no consideration was given to providing a reinforcement in the space formed between the hood ledge panel and fender, so if a reinforcement was provided, intake air resistance might be increased due to the presence of the reinforcement. It is therefore an object of this invention to provide an air intake assembly for a vehicle having a small air intake resistance, and which does not involve loss of strength of the reinforcement.

In order to achieve above object, this invention provides an air intake assembly for use with a vehicle engine, the vehicle comprising a hood ledge panel forming a side wall of an engine room and a fender on the side of the hood ledge panel. The air intake assembly comprises a reinforcement, situated between the fender and hood ledge panel and fixed to the upper and lower edges of the hood ledge panel, the hood ledge panel and reinforcement defining a substantially rectangular parallelopiped space, an air intake duct, whereof the edge part is fixed to the hood ledge panel, comprising an opening which communicates with the substantially rectangular parallelopiped space, and an opening of the reinforcement for connecting the substantially rectangular parallelopiped-shaped space with the space between the reinforcement and fender, the opening of the reinforcement facing the opening of the air intake duct.

Further, this invention provides a method for manufacturing an air intake assembly for a vehicle engine, wherein the vehicle is provided with a hood ledge panel which forms a side wall of an engine room, a fender disposed to the side of the hood ledge panel and a reinforcement situated between the fender and the hood ledge panel, the hood ledge panel and reinforcement forming a substantially rectangular parallelopiped space. The method of manufacturing the air intake assembly comprises a step for fixing the edge part of the air intake duct to the hood ledge panel so that the opening of the air intake duct communicates with the substantially rectangular parallelopiped-shaped space, and a step for providing an opening in the reinforcement, so that after manufacturing the air intake assembly, the opening in the reinforcement connects the substantially rectangular parallelopiped space between the reinforcement and the hood ledge panel with the space between the reinforcement and the fender, wherein the step for providing the opening in the reinforcement comprises forming of an opening by blanking press using a stamping die.

The details as well as other features and advantages of this invention are set forth in the remainder of the specification and are shown in the accompanying drawings.

DETAILED DESCRIPTION OF THE INVENTION

Figure 1:
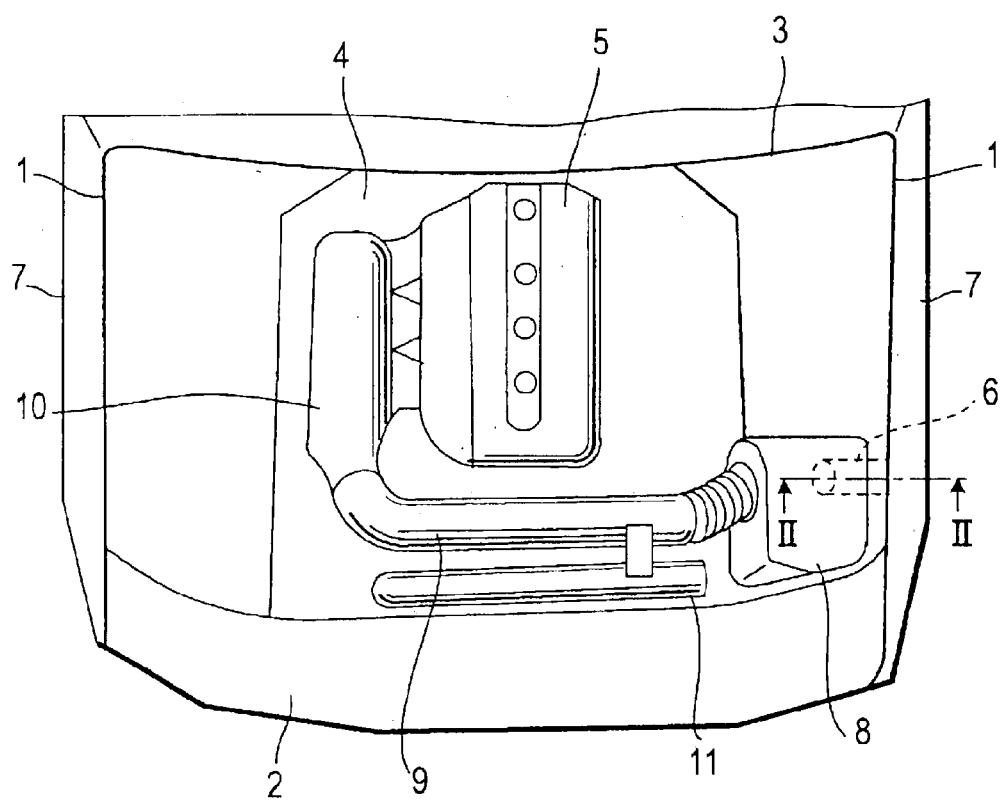
FIG. 1 is a plan diagram of an engine room showing the layout of an air intake assembly for a vehicle engine according to this invention.

A first embodiment of the invention will now be described referring to FIG. 1 and FIG. 2. FIG. 1 shows the layout of an engine room, and FIG, 2 is a detailed diagram showing an air intake assembly for a vehicle engine (hereafter referred to as "vehicle engine air intake assembly") according to the first embodiment.

Referring to FIG. 1, an engine room 4 is defined by hood ledges 1 (i.e., hood ledge panels) corresponding to the left and right side walls of the engine room 4, a radiator support 2 at the front of the vehicle and a rear dash panel 3. Fenders 7 are disposed to the sides of the hood ledges 1. An air inlet duct 6 fixed to one of the hood ledges 1 is provided at the front of the vehicle, and introduces air from outside the engine room 4 to an air cleaner 8. The air is introduced to an engine 5 via the air cleaner 8, intake duct 9 and intake manifold 10. A radiator 11 supported by the radiator support 2 is disposed at the front of the engine 5.

Figure 2A:
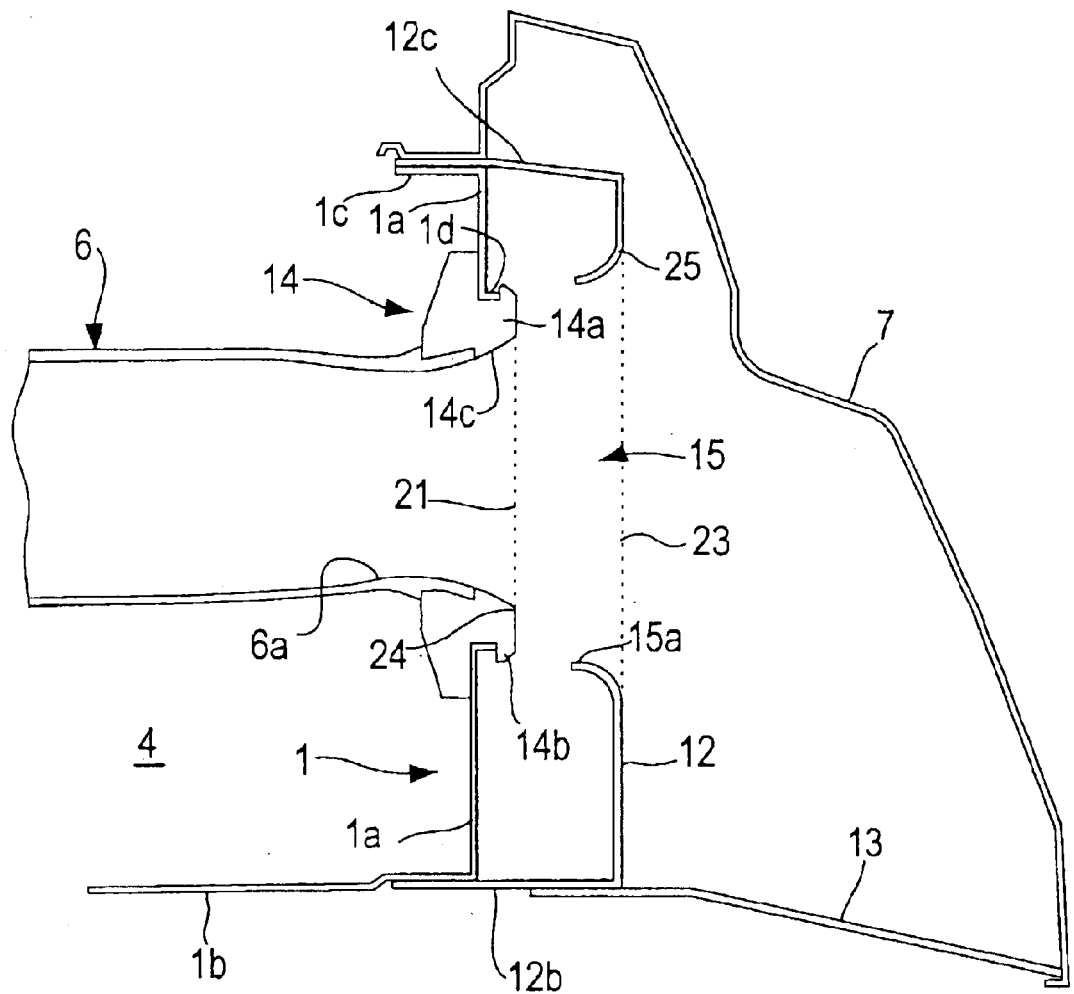
FIG. 2A is a cross-sectional diagram along a line II—II in FIG. 1 showing a first embodiment of the air intake assembly for a vehicle engine. Openings of the air intake assembly are shown by dotted lines.

FIG. 2A is a vehicle body cross-sectional diagram on one side of the engine room 4 taken in a perpendicular direction, showing the details of the air intake assembly. The vehicle body comprises a substantially L-shaped hood ledge 1, reinforcement 12 (i.e., reinforcement panel) covering a side wall 1a in the vertical direction of the hood ledge 1 from outside the engine room 4, a fender 7 also covering the hood ledge 1 and reinforcement 12 from outside the engine room 4, and a splash guard 13 suspended between the lower edge of the fender 7 and a horizontal part 1b of the hood ledge 1. The reinforcement 12 is situated between the fender 7 and hood ledge 1, and is fixed to the hood ledge 1.

A side member of box-shaped construction extending in the front/rear direction of the vehicle, not shown, is connected to the end of the horizontal part 1b of the hood ledge 1. The hood ledge 1 has a flange 1c at the upper end of the side wall 1a, and the end of an upper flange 12c of the reinforcement 12 is fixed to the flange 1c by welding or the like. The end of a lower flange 12b of the reinforcement 12 is fixed to the horizontal part 1b connected to the lower end of the side wall 1a by welding or the like. In this way, a substantially rectangular parallelepiped box-shaped space 30 is formed between the reinforcement 12 and side wall 1a of the hood ledge 1. The cross-section of the box-shaped space 30 in the perpendicular direction is effectively rectangular. The box-shaped space 30 maintains vehicle strength, and counteracts the effects of shocks in the front/ rear direction of the vehicle. If this box-shaped space is enlarged, i.e., if the reinforcement 12 extending in the front/rear direction of the vehicle is enlarged, the strength is increased.

The fender 7 is fixed by a tightening means e.g. by bolting, not shown, to the flange 1c on the upper end of the hood ledge 1 and the flange 12c on the upper edge of the reinforcement 12. The space between the fender 7 and reinforcement 12 is closed underneath by the splash guard 13, and opens outside the vehicle via a hole provided in a bumper, not shown, at the front of the vehicle.

A duct fixing hole 1d with a burr (or flange) projecting to the side of the reinforcement 12, is provided in the side wall 1a of the hood ledge 1. An end projection 14a of a rubber seal 14 fixed in one piece to the tip of the air inlet duct 6, fits into the duct fixing hole 1d. A radial projection 14b at the tip of the projection 14a of the seal 14 prevents the seal 14 from falling out of the duct fixing hole 1d. The tip of an air inlet port 6a of the air inlet duct 6 is divergent in the vicinity of the part to which the seal 14 is fixed. Therefore, at the tip, the diameter of the air inlet duct 6 increases towards the outside in the length direction of the air inlet duct 6. In other words, the tip of the air inlet port 6a may also be in the shape of the rim of a circular horn (or bell-mouth). To match the air inlet port 6a, an inner circumferential hole 14c of the seal 14 is also divergent.

The reinforcement 12 has an air inlet port 15 in the part opposite an opening 21 of the air inlet duct 6. The air inlet port 15 comprises an opening 23 formed in the reinforcement 12, and a ring-shaped air guide part 15a projecting toward the hood ledge 1. In FIG. 2A, the openings 21, 23 are shown by dotted lines. The air inlet port 15 has a circular horn-rimmed shape having an arc-shaped cross-section in the perpendicular direction along the II—II line and having a circular cross-section perpendicular to the II—II line, and the circular cross-sectional area of the opening 23 of the air inlet port 15 is larger than the circular cross-sectional area of the opening 21 of the air inlet duct 6. The circular cross-sectional area of the passage formed inside the air guide part 15a decreases towards the air inlet duct 6, however, it is larger than the cross-sectional area of the opening 21 of the air inlet duct 6. Due to this, air passage resistance can be decreased.

The above engine air intake assembly has the following functions. When outside air is aspirated due to the rotation of the engine 5, the outside air is introduced into the fender 7 via the hole in the bumper at the front of the vehicle body. Subsequently, air in the fender 7 passes through the air inlet port 15 of the reinforcement 12, enters the box space between the reinforcement 12 and hood ledge 1, and is then aspirated into the air inlet port 6a of the air inlet duct 6. As the air inlet port 6a of the air inlet duct 6 is connected to the box space, admixture of water with the air is also avoided. As the air inlet port 15 is formed in a circular-horn-rimmed shape, air is guided into the air inlet port 15 when air in the fender 7 is aspirated into the air inlet port 15.

Figure 2B:
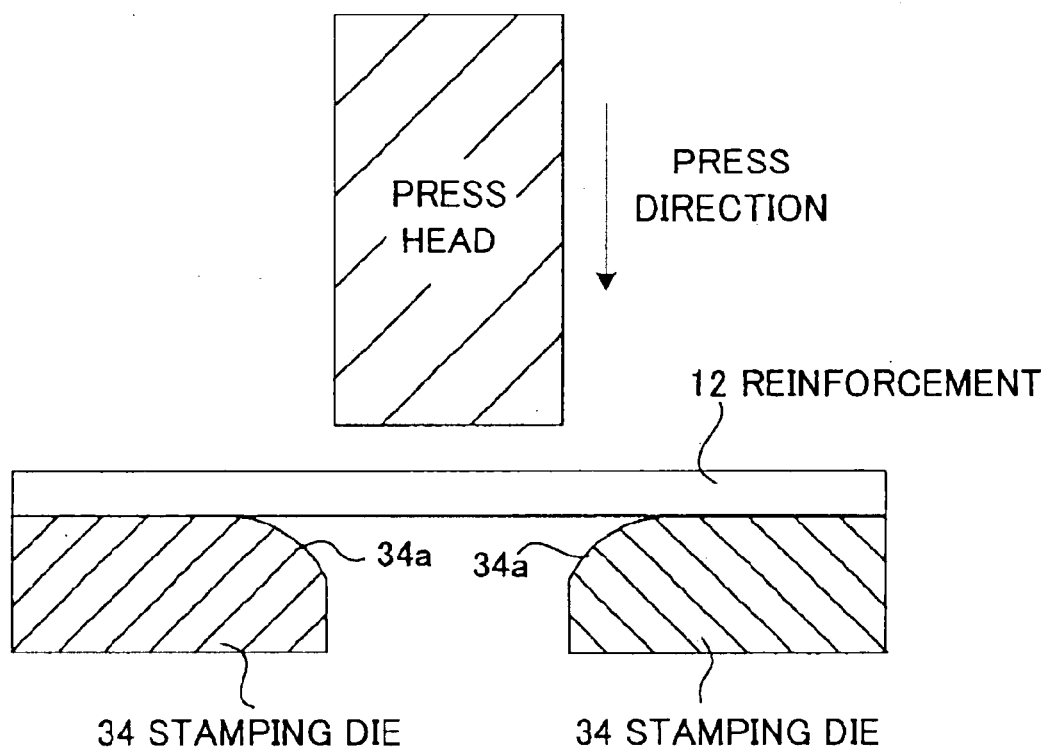
FIG. 2B is a cross-sectional diagram showing a step of forming an air inlet port of a reinforcement.

The press forming by a press of the air inlet port 15 of the reinforcement 12 will now be described in detail referring to FIG. 2B. When the reinforcement 12 is manufactured, a blanking press is performed in a direction running from outside the vehicle after assembly to the air inlet port 6, and the shape of the air inlet port 15 is simultaneously arranged by a stamping die 34. The die 34 has a curved part 34a having a shape which fits the air guide part 15a. Hence, the air inlet port 15 can be easily formed, and the dimensional precision of the air inlet port 15 is also increased.

Due to the provision of the opening 23 of the air inlet port 15, the strength of the reinforcement 12 decreases, but as the air guide part 15a functions as a flange connected to the end 25 of the opening 23 of the air inlet port 15, loss of strength is suppressed. By arranging the shape of the air guide part 15a, the strength of the reinforcement 12 can be further increased.

Figure 3:
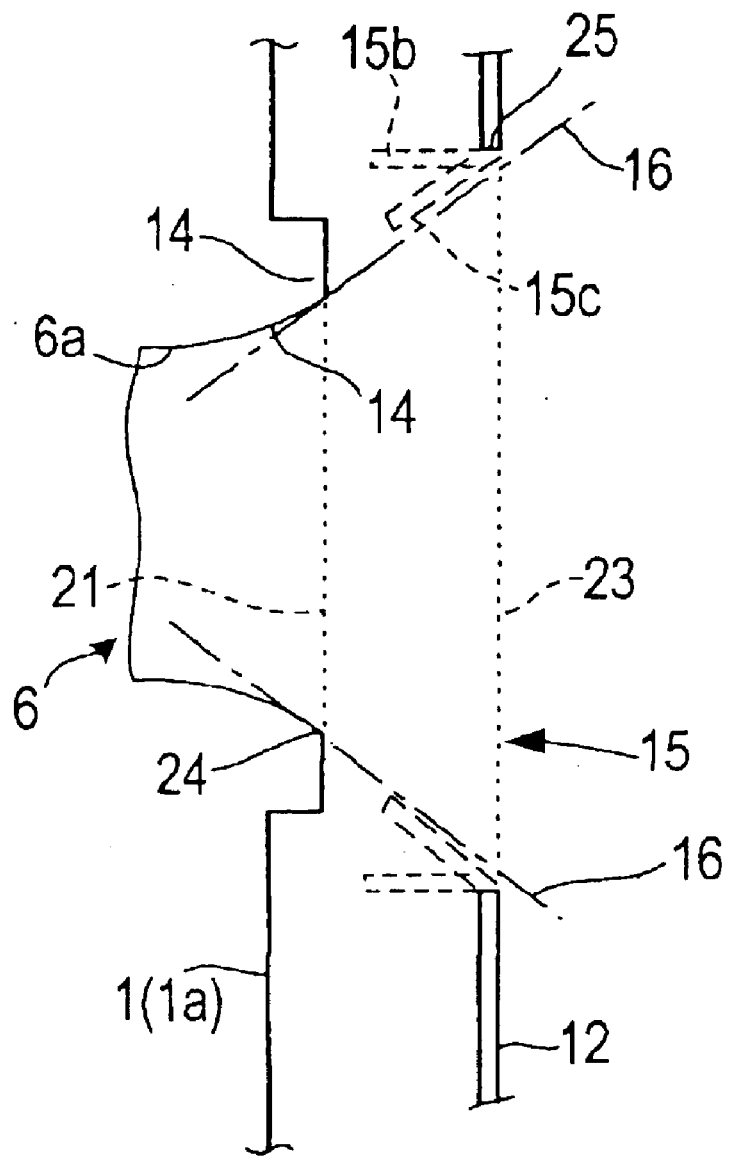
FIG. 3 is a cross-sectional diagram along a line II—II in FIG. 1 showing a second embodiment of the air intake assembly for a vehicle engine. Openings of the air intake assembly are shown by dotted lines.

FIG. 3 shows a second embodiment of the air inlet port 15 provided for the reinforcement 12. The air inlet port 15 is manufactured by simply providing a hole in the reinforcement 12. As shown by the alternate long and short dashed lines, the cross-sectional area of the opening 23 of the air inlet port 15 is larger than the cross-sectional area of the opening 21 of the air inlet port 6a. Also, the edge 25 of the air inlet port 15 is situated further outside than a conical surface 16 comprising the tangent lines on the edge 24 of the opening 21 of the air inlet port 6a. Due to this, the air flow becomes smooth, and air intake resistance is decreased.

A cylindrical-shaped air guide part 15b may optionally also be formed in one piece with the reinforcement 12 at the edge 25 of the air inlet port 15 to maintain strength, as shown by the short-dashed line in the diagram. Herein, the air guide part 15b is situated outside the conical surface 16 comprising the tangent lines at the edge 24 of the opening 21 of the air inlet duct 6.

If the air guide part 15c is formed in a conical ring shape as shown by the long-dashed line in the diagram, air inflow resistance can be further decreased. Herein, the conical surface 16 comprising the tangent lines at the edge 24 of the opening 21 of the air inlet port 6a effectively coincides with the inner conical surface of the air guide part 15c.

Figure 4:
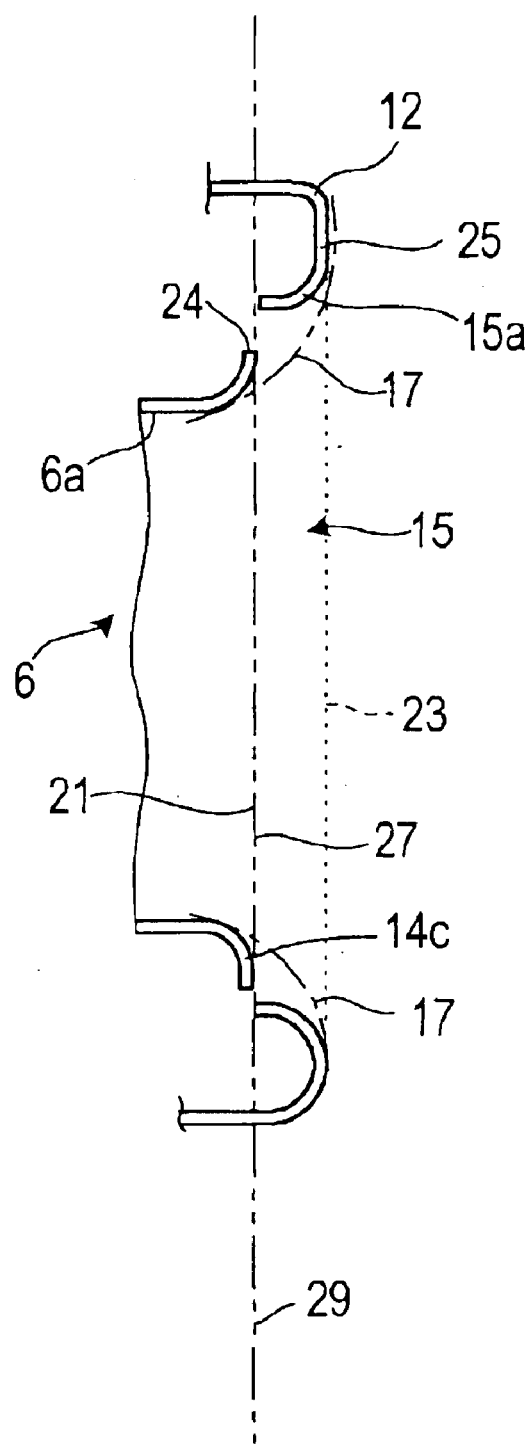
FIG. 4 is a cross-sectional diagram along a line II—II in FIG. 1 showing a third embodiment of the air intake assembly for a vehicle engine. Openings of the air intake assembly are shown by dotted lines.

FIG. 4 shows a third embodiment of the air inlet port 15 provided in the reinforcement 12. The air guide part 15a of the air inlet port 15 is circular horn rimmed-shaped, and the tip of the air inlet duct 6 is also circular horn rimmed-shaped.

As the air inlet port 15 and air inlet duct 6 are in sufficient proximity, the two horn-rimmed shapes of the air intake port 15 and air inlet port 6 reinforce each other, and function as a large, horn-shaped single virtual air passage 17 as shown by the alternate long and short dashed line in the diagram. Therefore, air can be aspirated from the horn-shaped virtual air passage 17 into the air inlet duct 6, and the air flow is smooth. It is preferred that the opening 21 of the air inlet duct 6 and an opening 27 at the tip of the air guide part 15a are substantially situated above the same plane 29 shown by the double dotted line.

The entire contents of Japanese Patent Application P2002-257515 (filed Sep. 3, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An air intake assembly for use with a vehicle engine, the vehicle comprising a hood ledge panel forming a side wall of an engine room and a fender on the side of the hood ledge panel, the air intake assembly comprising:

a reinforcement, situated between the fender and hood ledge panel and fixed to the upper and lower edges of the hood ledge panel, the hood ledge panel and reinforcement defining a substantially rectangular parallelopiped space, an air intake duct, whereof the edge part is fixed to the hood ledge panel, comprising an opening which communicates with the substantially rectangular parallelopiped space, and an opening of the reinforcement for connecting the substantially rectangular parallelopiped-shaped space with the space between the reinforcement and fender, the opening of the reinforcement facing the opening of the air intake duct.

2. The air intake assembly as defined in claim 1, wherein the cross-sectional area of the opening of the reinforcement is larger than the cross-sectional area of the opening of the air intake duct.

3. The air intake assembly as defined in claim 1, wherein tangent lines at the edge of the opening of the air intake duct constitute a conical surface and wherein the edge of the opening of the reinforcement is situated outside the conical surface.

4. The air intake assembly as defined in claims 1, comprising an intake air guide part extending from the edge of the opening of the reinforcement to the side of the opening of the air intake duct.

5. The air intake assembly as defined in claim 4, wherein the intake air guide part of the reinforcement has a horn-rimmed shape.

6. The air intake assembly as defined in claim 5, wherein the tip of the intake air duct has a horn-rimmed shape, the opening of the air intake duct is in sufficient proximity to the opening of the reinforcement, and the tip of the air intake duct and the intake air guide part of the reinforcement function as a horn-shaped single air intake passage.

7. The air intake assembly as defined in claim 4, wherein the air intake guide part of the reinforcement has a conical ring-shape.

8. The air intake assembly as defined in claim 7, wherein the tip of the intake air duct has a horn-rimmed shape, and a conical surface comprising tangent lines at the edge of the opening of the air intake duct effectively coincides with an inner conical surface of the conical ring-shaped air guide part.

9. The air intake assembly as defined in claim 4, wherein the intake air guide part of the reinforcement has a cylindrical ring shape.

10. A method for manufacturing an air intake assembly for a vehicle engine, wherein the vehicle is provided with a hood ledge panel which forms a side wall of an engine room, a fender disposed to the side of the hood ledge panel and a reinforcement situated between the fender and the hood ledge panel, the hood ledge panel and reinforcement forming a substantially rectangular parallelopiped space, the method of manufacturing the air intake assembly comprising:

a step for fixing the edge part of the air intake duct to the hood ledge panel so that the opening of the air intake duct communicates with the substantially rectangular parallelopiped-shaped space, and a step for providing an opening in the reinforcement, so that after manufacturing the air intake assembly, the opening in the reinforcement connects the substantially rectangular parallelopiped space between the reinforcement and the hood ledge panel with the space between the reinforcement and the fender, wherein the step for providing the opening in the reinforcement comprises forming of an opening by blanking press using a stamping die.

* * * * *